UNITED STATES PATENT OFFICE.

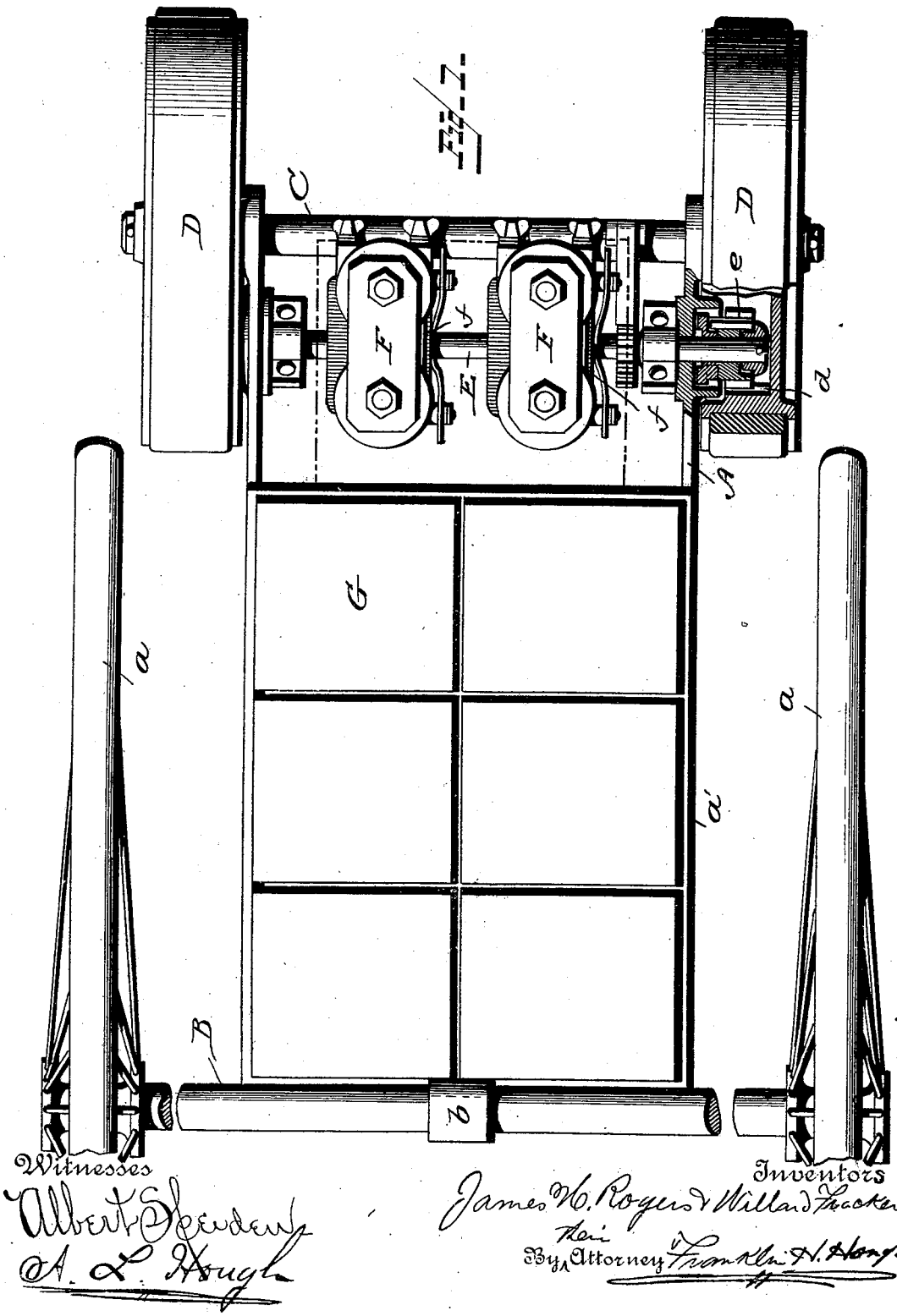

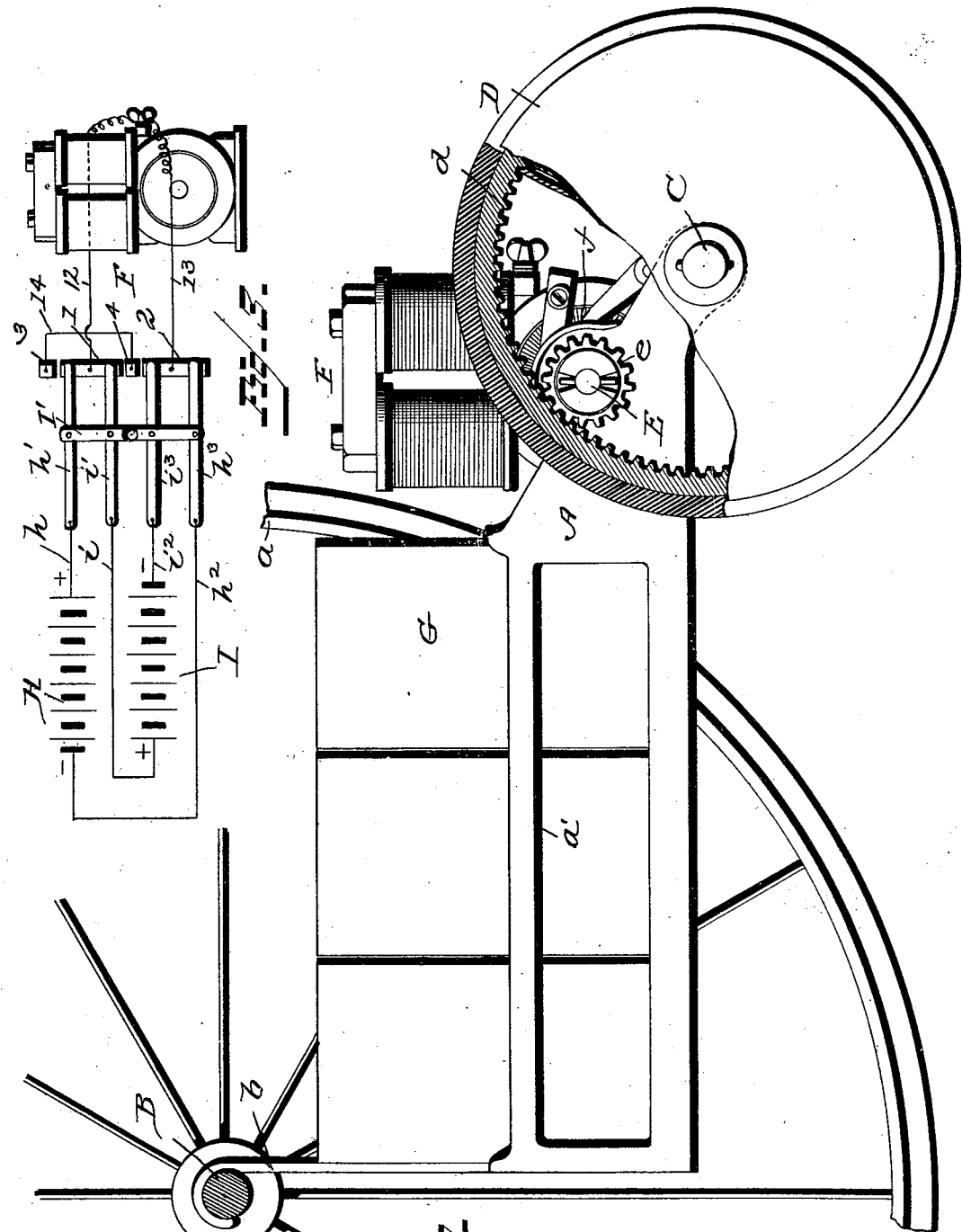

JAMES HARRIS ROGERS AND WILLARD FRACKER, OF WASHINGTON, DISTRICT OF COLUMBIA.

ELECTRICALLY-PROPELLED VEHICLE.

SPECIFICATION forming part of Letters Patent No. 512,327, dated January 9, 1894.

Application filed January 31, 1893. Serial No. 460,418. (No model.)

*To all whom it may concern:*

Be it known that we, JAMES HARRIS ROGERS and WILLARD FRACKER, citizens of the United States, residing at Washington, District of Columbia, have invented certain new and useful Improvements in Electric Motors for Vehicles; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in electric-motors for propelling vehicles, and it has for its object to provide means for propelling vehicles by electricity, being designed more especially for those of a light character, such as are adapted for carrying one or two persons.

In perfecting our invention we have sought to make the connections between the motor and the driving-wheels as direct as possible, so as to secure both simplicity of structure and the utilization of the full efficiency of the motor. We have also had in view the production of a device adapted for use in connection with vehicles in common use, such for instance, as tricycles, without necessitating the strengthening of the parts of the vehicle by reason of the additional weight of the motor and its accompaniments. It has been our further aim to make the task of changing the batteries as convenient as possible.

Other features and advantages will hereinafter appear; those named being regarded as of the greater importance.

With the above ends in view, our invention consists in the electric-motor adapted for propelling vehicles, and in the novel construction, combination and adaptation of parts, all as more fully hereinafter described, shown in the accompanying drawings and then specifically defined in the appended claims.

The invention is clearly illustrated in the accompanying drawings, which, with the letters and figures of reference marked thereon, form a part of this specification, and in which drawings—

Figure 1 is a plan view of our motor, the same being shown as applied to a vehicle. Fig. 2, is a side view partly in section, and Fig. 3, is a diagram showing the connections between the batteries and the motor.

In carrying our invention into practice, we employ a frame A, having at its front end provision for attachment to the axle B of the vehicle to be propelled, such provision being simply a hook $b$, and at its rear end a transverse shaft C, on which are journaled two driving-wheels D, D. The diameter of the latter need not be great; that shown being about one third the diameter of the vehicle wheels $a$. Each wheel D has an integral gear $d$ with which meshes a pinion $e$ on the end of a transverse shaft E running parallel with but higher than and in advance of the shaft C. The pinions $e$ are quite small in diameter compared with the gears, so that a very rapid rotation of the former will result in a slow rate of rotation of the wheels D, D.

For rotating the shaft E, we employ one or more, preferably two, small electro-motors, F, F, and mount their armatures $f, f$, directly upon said shaft. It will thus be seen that the power of the motors is directly applied to the driving wheels, with the intervention only of the pinions, and internal gear; thus securing simplicity, and the employment of the full efficiency of the motors at high speed, which is attained in view of the relative sizes of the pinions and gears, without undue rapidity of rotation of the wheels D, D. The pinions are not positively fixed to the shaft, but are clutched thereto by devices similar to those which are employed with the wheels of reapers and like machines, and for a similar purpose, namely, the temporary cessation of rotation of one wheel when the machine is making a turn. This expedient is of such well known character that further description is thought to be unnecessary.

The source of electric-energy is a secondary battery G carried in a box like receptacle $a'$ provided for the purpose on the frame A, in advance of the motors and driving wheels. This battery is shown best in Fig. 3, and is divided into two sections H and I which are connected with the motors so as to be used either in quantity or in series. Such connections are as follows:—From the positive pole or section A, a wire $h$ runs to a movable conducting-plate $h'$, and from the positive pole of section I, a wire $i$ runs to a similar plate $i'$. From the negative pole of the section H a wire $h^2$ runs to a third movable conducting plate $h^3$, and from the negative pole of section I, a wire $i^2$ runs to a like fourth plate $i^3$. These four plates are arranged parallel with each other, and are connected by a bar I' of insulating material. The free ends of the said plates are adapted to co-operate with four insulated contacts, 1, 2, 3 and 4. The contacts 1 and 2 are each of a size adapted to have two plates at a time upon it, the former (1), plates $h'$ and $i'$, and the latter (2), $h^3$ and $i^3$, and 3 and 4, but one at a time, plate $h'$ being designed to contact with 3, and plate $i'$ with 4. Contact 1 is connected by a wire 12 with one brush of the commutator, and contact 2, by a wire 13, with the other brush, while the two remaining contacts, 3 and 4 are electrically connected by the wire 14.

With the parts arranged as shown in Fig. 3, the connections are for quantity, the current from both sections passing from the positive poles to the plates $h'$ and $i'$, to contact 1, thence to the motor by wire 12, and returning by wire 13 to contact 2, and plates $h^3$ and $i^3$. To have the sections operate in series, the plates are shifted so as to place $h'$ upon contact 3, and $i^3$ upon contact 4, plate $i'$ remaining upon contact 1, and plate $h^3$ upon contact 2. The circuit will then be from section H to plate $h'$, contact 3, wire 14, contact 4, plate $i^3$; thence to section $i$, from the latter to plate $i'$, contact 1, thence to motor by wire 12, thence by wire 13 to contact 2, plate $h^3$ and back to section H by wire $h^2$.

The switch described will be located within convenient reach of the person using the vehicle, and preferably the wires will be carried within flexible tubes.

It will be seen that by our invention we provide a simple and efficient motor, which will be admirably adapted for propelling light conveyances, such as tricycles. It is especially adapted for use in the postal service in propelling light vehicles such as are employed in collecting and delivery of mails, in cities. Its employment involves no special adaptation of the vehicle to be propelled, either for its connection therewith or by reason of increased weight, as the weight is largely borne by the wheels D. When the battery is to be recharged, it is simply necessary to disconnect the hook $b$ and the entire machine is in convenient condition for handling.

What we claim to be new, and desire to secure by Letters Patent, is—

1. In combination with a frame provided with a hook by which it is adapted to be detachably connected at its front end to the front wheels of a vehicle, the battery carried thereby, the wheels at the rear end of the frame, and the motor geared to said wheels, substantially as specified.

2. In combination with an electric motor, a battery divided into sections, a switch-plate connected with each pole of each of said sections, the two insulated contacts connected with the motor each of which is adapted to close the circuit with the switch plates from like poles, and the two electrically connected contacts to close the circuit with two plates from opposite poles, substantially as described.

In testimony whereof we affix our signatures in presence of two witnesses.

JAMES HARRIS ROGERS.
WILLARD FRACKER.

Witnesses:
P. J. ROGERS,
FRANKLIN H. HOUGH.